(No Model.)
H. H. BROWN.
Box Joint Fastener.
No. 237,806.    Patented Feb. 15, 1881.
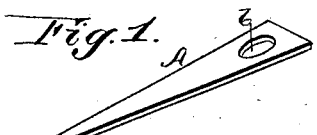
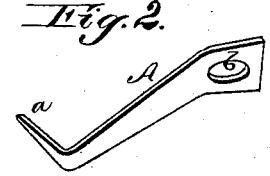
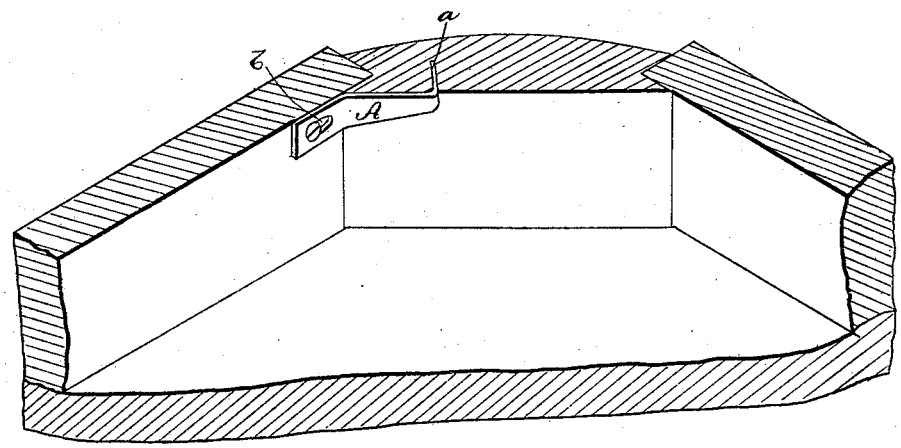
Witnesses:
Inventor:
H. H. Brown,
per J. H. Alexander
Attorney.

UNITED STATES PATENT OFFICE.

HENRY H. BROWN, OF DECATUR, ILLINOIS.

BOX-JOINT FASTENER.

SPECIFICATION forming part of Letters Patent No. 237,806, dated February 15, 1881.

Application filed December 24, 1880. (No model.)

*To all whom it may concern:*

Be it known that I, HENRY H. BROWN, of Decatur, in the county of Macon and State of Illinois, have invented certain new and useful Improvements in Box-Joint Fasteners; and I do hereby declare that the following is a full, clear, and exact description thereof, reference being had to the accompanying drawings, and to the letters of reference marked thereon, which form part of this specification, in which—

Figure 1 is a view of a blank; Fig. 2, a finished fastener, and Fig. 3 a view of my fastener applied to a burial-casket.

The nature of my invention relates to fasteners for boxes, burial-caskets, or any article having corners at such an angle as to preclude the secure fastening of them by dovetailing, screwing, or nailing. Hitherto it has been common in such cases to secure the corners by a strip of metal upon the inside of the receptacle, having a hole in each end, through which a screw is passed; but this requires a great deal of time and a large number of screws, and the object of this device is to effect a saving in such time, labor, and material; and to this end it consists in a triangular strip of wrought or malleable metal having its pointed end bent at right angles to form a hook to be driven into the wood, and its other end bent in the opposite direction to fit the angle of the corner, and provided with a hole for the passage of a screw, as will be hereinafter more fully set forth.

To enable others skilled in the art to which my invention appertains to make and use the same, I will now proceed to describe its construction and operation.

A represents a strip of wrought or malleable metal, of triangular form, having its pointed end bent at right angles to form a hook, $a$, which is driven into the wood, as seen in Fig. 3. The other or broad end of the fastener is bent backward in a direction opposite to the hook $a$ at an angle corresponding to the angle of the corner on which it is to be used, and is provided with an oval or oblong hole, $b$, through which a screw is passed into the wood to secure the fastener in place.

The screw, which should be tapering, is inserted in the hole as near its outer end as possible, so that in its entrance it will gradually tighten the joint, and thus not only more firmly hold the parts together, but make a neater finished corner.

The device may be applied to securing the tops of tables to their frames by bending the large end at right angles, and, indeed, may be used in almost any article where a corner is to be secured.

Having thus fully described my invention, what I claim, and desire to secure by Letters Patent, is—

The combination, with the two parts to be united, of a sheet-metal strip having one slotted end resting on one part and a driven end embedded in the other part, and with a taper fastener embedded in the first part and bearing against the outer end of the slot, as and for the purpose herein described.

In testimony that I claim the foregoing as my own I affix my signature in presence of two witnesses.

HENRY H. BROWN.

Witnesses:
JOHN H. MANZY,
WILLIAM W. FOSTER.